Patented July 29, 1947

2,424,730

UNITED STATES PATENT OFFICE 2,424,730

COATING COMPOSITION COMPRISING A VEHICLE CONTAINING DRYING OIL-MODIFIED ALKYD OR PHENOL-FORMALDEHYDE RESIN, PIGMENT, LITHARGE, AND CALCIUM HYDRATE

Ladislaus Balassa, Swarthmore, Pa., assignor to E. I. du Pont de Nemours & Company, Wilmington, Del., a corporation of Delaware No Drawing. Application January 25, 1944,
Serial No. 519,653

6 Claims. (Cl. 260—19)

This invention relates to primer coating compositions and more particularly to anti-corrosion metal protective primer coating compositions.

Primer coating compositions have been used extensively in the decorative and protective coating industry for some time. Such compositions are applied as the first coating to the surface to be protected to form a base for subsequent so-called finishing coatings. The primer compositions are ordinarily characterized by relatively high pigment content in a non-volatile film forming vehicle which may be of a resinous or oleoresinous type. The compositions may be of the air drying or of the baking type. For many uses they may desirably possess anti-corrosive (or metal protective) properties. Such properties are imparted to the compositions by the type of pigment used. Desirable and substantially requisite properties of primer compositions are that films or coatings produced therefrom possess good water resistance and that the coatings applied to the substrate dry rapidly, particularly the air-drying types. This latter requisite is of particular importance where speed of production in finishing articles is necessary. While considerable progress has been made in the improvement of such primer compositions much is still to be desired in the speed of drying of the coatings and in the water resistance of films produced therefrom.

This invention presents as the principal object the provision of improved primer coating compositions.

Another object is the provision of such primer coating compositions possessing rapid drying properties and becoming free from top tack within a relatively short period of time after application.

Still another object is the provision of primer coating compositions possessing improved water resistance over known available comparable compositions.

A further object is the provision of means for preparing such compositions which are simple and economical.

Other objects will be apparent as the description of the invention proceeds.

These objects are accomplished in the present invention by the addition of definitely proportioned minor quantities of litharge and calcium hydrate during the dispersion of the pigment in the film forming vehicle of the composition.

The invention will be more clearly understood from the following examples in which the parts are by weight.

EXAMPLE I

*Zinc chromate primer composition*

| Zinc chromate base: | Parts |
|---|---|
| China-wood oil-phenol/formaldehyde resin varnish | 31.5 |
| Zinc yellow pigment | 52.8 |
| Litharge | .4 |
| Calcium hydrate | .4 |
| Xylene | 14.9 |
| | 100.0 |

The China-wood oil-phenolic resin varnish is a 12½ gallon oil length varnish having a viscosity of A (Gardner-Holdt scale) and total solids of 35.0%, the solvent or thinner being a high solvency petroleum naphtha.

The ingredients were charged into a stone or porcelain lined ball mill with steel balls and turned for approximately 50,000 cycles. The preferred ball to batch ratio is approximately 3:1 by weight.

| Asbestine base: | Parts |
|---|---|
| China-wood oil-phenol/formaldehyde resin varnish | 34.6 |
| Asbestine (magnesium silicate) | 35.6 |
| Xylene | 29.8 |
| | 100.0 |

The China-wood oil-phenolic resin varnish used was as described above.

The ingredients were charged into a porcelain or porcelain lined pebble mill with pebbles and the mill and contents then turned for approximately 50,000 cycles. Porcelain balls may be used in place of pebbles and the preferred pebble or ball to batch ratio is 2:1.

Finished primer:

| | Parts |
|---|---|
| Zinc chromate base | 50.6 |
| Asbestine base | 16.2 |
| Phenolic resin varnish | 22.4 |
| Ethyl cellulose solution | 8.6 |
| Xylene | 2.2 |
| | 100.0 |

The phenolic resin varnish is a 12½ gallon oil length China-wood oil-oil soluble phenol-formaldehyde varnish thinned with xylene to approximately 75% solids and having a viscosity of Z-4 (Gardner-Holdt scale).

The ethyl cellulose solution used was an approximately 22.5% solution of 20 centipoise ethyl cellulose in a solvent mixture of 4 parts xylene to 1 part ethyl acetate (85–88%).

The finished primer was prepared by mixing the ingredients in a suitable mixing tank, preferably one equipped with rotating blade mixers of the propeller type, until a homogeneous composition was obtained.

The percentage of litharge and calcium hydrate in the finished primer composition was 0.78% and 0.78% respectively based on the total binder solids exclusive of these materials.

The primer when applied to a suitably prepared metal surface by spraying, in film builds up to .0005 inch will dry essentially tack-free within 10 minutes at room temperature. A similar primer composition in which no litharge and calcium hydrate was used in dispersing the pigment shows considerable top-tack even after 30 minutes drying at room temperature.

A conventional test for the quantitative determination of top-tack may be carried out as follows. Two suitably solvent cleaned panels, 4 inches by 12 inches, are sprayed on one face with the primer composition to be tested and are then allowed to dry at room temperature (70°–90° F.) for 10 minutes. The primed panels are then placed face to face and the two panels placed under a 30 pound weight and allowed to remain so for 24 hours. The weight should be applied over the entire area of the panels. After 24 hours the panels are separated. The top-tack is considered to be in direct ratio to the effort necessary to separate the panels and to the percentage area of bare metal showing due to the greater cohesion of the primer composition films than to the adhesion of the primer film to the metal substrate. The primer composition of the present example when tested according to such a procedure showed only 2% bare metal as against approximately 15% bare metal with a similar composition in which no litharge and calcium hydrate was used in dispersing the pigment.

EXAMPLE II

Zinc chromate primer composition

Zinc chromate base:

| | Parts |
|---|---|
| Drying oil modified alkyd resin solution | 6.8 |
| Xylene | 31.7 |
| Zinc chromate pigment | 60.6 |
| Calcium hydrate | .45 |
| Litharge | .45 |
| | 100.00 |

The drying oil modified alkyd resin used was a 49% China-wood/linseed oil (1:1) modified glyceryl phthalate solution in xylene with a total solids content of 60%.

The ingredients were charged into a ball mill and the pigment dispersed in the film forming resin as described under Example I.

Asbestine base:

| | Parts |
|---|---|
| Drying oil modified alkyd resin solution | 19.2 |
| Xylene | 34.6 |
| Asbestine (magnesium silicate) | 46.2 |
| | 100.0 |

The alkyd resin solution used was the same as used in dispersing the zinc chromate pigment above.

Finished primer composition:

| | Parts |
|---|---|
| Zinc chromate base | 44.0 |
| Asbestine base | 10.3 |
| China-wood/linseed oil modified alkyd resin solution | 36.4 |
| Ethyl cellulose solution | 9.3 |
| | 100.0 |

The alkyd resin solution and ethyl cellulose solution used were those as previously described.

The finished composition may be prepared according to the procedure described under Example I or by any other suitable or convenient means.

The litharge and calcium hydrate content in the finished primer, based on the film forming vehicle is 0.74% for each.

When applied to suitably prepared metal substrate by spraying in film builds up to .0005 inch the primer composition dries essentially tack-free within ten minutes. A similar product in which litharge and calcium hydrate are not present during the pigment dispersion operation retains considerable top tack after several hours drying. In the test described under Example I the composition of this example showed only 1% bare metal while the control composition showed more than 15%.

EXAMPLE III

Dark grey primer

Mill base:

| | Parts |
|---|---|
| Alkyd resin solution | 8.0 |
| Xylene | 32.0 |
| Titanium dioxide | 10.0 |
| Powdered slate | 37.4 |
| Talc | 6.0 |
| Absentine | 6.0 |
| Calcium hydrate | .2 |
| Litharge | .4 |
| | 100.0 |

The ingredients were charged into a ball mill and the pigments and fillers dispersed in the film forming resin by turning for approximately 50,000 cycles with a ball to batch ratio of approximately 3:1 by weight.

Finished primer composition:

| | Parts |
|---|---|
| Mill base | 60.0 |
| Alkyd resin solution | 35.0 |
| Xylene | 4.6 |
| Cobalt naphthenate drier | .2 |
| Manganese naphthenate drier | .2 |
| | 100.0 |

The above ingredients are thoroughly mixed as described under Example II or by any other suitable or convenient means, to obtain a homogeneous composition.

The alkyd resin solution used in this composition was a 43% dehydrated castor oil modified glyceryl phthalate-50% solution in Hi-flash naphtha.

The litharge and calcium hydrate content in the finished primer composition is 1.2% and 0.6% respectively based on the total binder or film forming solids.

This primer composition when used as described under the previous examples yields results as to improved top tack and decreased drying time of the same order as obtained with the chromate primers. The composition may be applied to substrates other than metal and such use will be apparent to those skilled in the art of using primer compositions.

EXAMPLE IV

Red oxide primer

| Mill base: | Parts |
|---|---|
| Oil modified alkyd resin solution | 7.3 |
| High solvency petroleum naphtha | 32.7 |
| Red iron oxide | 27.0 |
| Blanc fixe | 20.0 |
| Asbestine | 6.0 |
| Talc | 6.0 |
| Calcium hydrate | .6 |
| Litharge | .4 |
| | 100.0 |

The ingredients are charged into a suitable ball mill and the pigments dispersed as described under Example III.

| Finished primer composition: | Parts |
|---|---|
| Mill base | 60.0 |
| Oil modified alkyd resin solution | 31.8 |
| Xylene | 7.8 |
| Cobalt naphthenate drier | .2 |
| Manganese naphthenate drier | .2 |
| | 100.0 |

The ingredients are mixed as previously described to obtain a homogeneous composition.

The alkyd resin used in this example was a 50% soya bean oil modified glyceryl phthalate resin-55% solution in a solvent mixture of mineral spirits 2 parts and high solvency petroleum naphtha 1 part.

When used as previously described the primer composition yields results as to improved top tack and decreased drying time of the same order as obtained with the chromate primers.

The litharge and calcium hydrate content in the finished primer is 1.2% and 1.8% respectively based on the total binder or film forming solids.

Other film forming vehicles than those shown in the examples may be used, those based on drying fatty oils being in general preferred.

It has been found that the combined litharge and calcium hydrate in the finished composition may vary between 0.1% and 4.0% based on the film forming solids with a preferred range of 0.25 to 3.0%. While the litharge and the calcium hydrate are preferably used in substantially equal amounts they may be used in ratios as widely varied as 80:20 or 20:80. The particular ratio used will be governed largely by particular properties desired in the finished product. In general more litharge and less calcium hydrate is preferred in the so-called harder film forming vehicles while in the softer vehicles more calcium hydrate and less litharge will be preferred. In carrying out the invention it is essential that the litharge and calcium hydrate be added during the dispersion operation. These materials cannot be merely added to the finished coating compositions as then they would not produce the desired result. It is also to be understood that litharge or calcium hydrate alone are ineffective, and that both must be present.

The compositions described herein are of principal use as metal protective primers, wood primers and other relatively highly pigmented paint compositions in which rapid dry and reduced top tack is desirable or necessary. Various uses will be readily apparent to those skilled in the art of protective and decorative coating compositions.

It will be seen from the above description that a marked advance has been made in the art in providing coating compositions which possess as principal advantages over similar compositions now available, increased speed of drying, reduced top tack of films prepared therefrom, improved moisture resistance and harder coatings. Other advantages will be readily apparent through the use of the compositions.

It is apparent that many widely different embodiments of this invention may be made without departing from the spirit and scope thereof, and therefore, it is not intended to be limited except as indicated in the appended claims.

I claim:

1. A pigmented coating composition a film of which of about .0005 inch in thickness dries at room temperatures in less than about 10 minutes to a tack-free stage, comprising a vehicle containing a resin selected from the group consisting of alkyd and phenol formaldehyde resins modified with a drying fatty oil, a pigment and from .1% to 4.0% of litharge and calcium hydrate based on the total film-forming solids, the ratio of litharge to calcium hydrate being between 4 parts of litharge to 1 part of calcium hydrate and 1 part of litharge to 4 parts of calcium hydrate, the said pigment having been dispersed in the said vehicle in the presence of the said litharge and calcium hydrate.

2. The composition of claim 1 in which the litharge and calcium hydrate are present in equal amounts and their combined weight is from .25 to 3.0% of the film-forming solids.

3. The process of preparing protective pigmented coating compositions a film of which having a thickness of .0005 inch dries at room temperatures to a tack-free stage in less than about 10 minutes which comprises dispersing a pigment in a vehicle containing a resin selected from the group consisting of alkyd and phenol formaldehyde resins modified with a drying fatty oil and during the dispersion adding from .1% to 4.0% of litharge and calcium hydrate based on the total film-forming solids, the ratio of litharge to calcium hydrate being between 4 parts of litharge to 1 part of calcium hydrate and 1 part of litharge to 4 parts of calcium hydrate.

4. The process of claim 3 in which the litharge and calcium hydrate are present in equal amounts and their combined weight is from .25 to 3.0% of the film-forming solids.

5. A metallic surface having a protective coating thereon of the composition of claim 1.

6. The process of preparing a priming composition which is highly resistant to corrosion and a film of which .0005 inch in thickness dries to the tack-free stage in less than about 10 minutes which comprises charging a ball mill with a vehicle containing a resin selected from the group consisting of alkyd and phenol formaldehyde resins modified with a drying fatty oil, a pigment and a solvent, dispersing the pigment in the vehicle by grinding in the said ball mill, and during the grinding cycle adding thereto .4% of litharge and .4% of calcium hydrate based on the entire composition.

LADISLAUS BALASSA.

REFERENCES CITED

The following references are of record in the file of this patent:

UNITED STATES PATENTS

| Number | Name | Date |
| --- | --- | --- |
| 2,287,060 | Oakes | June 23, 1942 |
| 2,308,498 | Earhart et al. | Jan. 19, 1943 |

OTHER REFERENCES

Pages 502 and 503, Protective and Decorative Coatings, by Mattiello, vol. 1, 1941.